Figure 1:
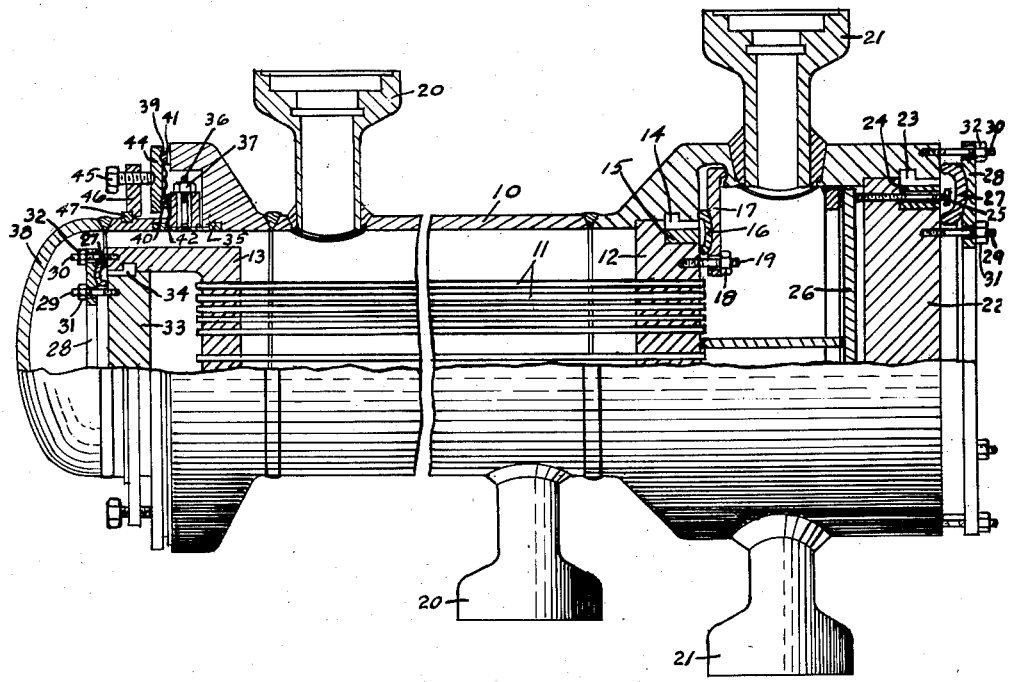

Oct. 21, 1958

N. GERTZON 2,857,142

HEAT EXCHANGER

Filed Aug. 5, 1955

3 Sheets-Sheet 1

INVENTOR
Nils Gertzon

Oct. 21, 1958    N. GERTZON    2,857,142
HEAT EXCHANGER

Filed Aug. 5, 1955    3 Sheets-Sheet 2

INVENTOR
Nils Gertzon

Oct. 21, 1958  N. GERTZON  2,857,142
HEAT EXCHANGER

Filed Aug. 5, 1955  3 Sheets-Sheet 3

INVENTOR
Nils Gertzon

United States Patent Office 2,857,142
Patented Oct. 21, 1958

2,857,142

HEAT EXCHANGER

Nils Gertzon, New York, N. Y.

Application August 5, 1955, Serial No. 526,722

9 Claims. (Cl. 257—239)

This invention relates to improvements in closures for pressure vessels and heat exchangers and in particular to head closure members for apparatus adapted to operate at any pressures.

A feature of the devices resides in a simple, very economical and improved means of closing a pressure vessel or heat exchanger using relatively small bolts in all cases.

My invention eliminates the gross hydrostatic load from the bolts and particularly gasketing the enclosure by eliminating close machining tolerances, thus making the economy of manufacturing very favorable.

It is the principal object of my invention to provide enclosure members for pressure vessels and heat exchangers in which the hydrostatic main load is transmitted to the vessel wall and a fluid seal independent of the gross hydrostatic end force and independent of close machining of any parts involved.

Another object of my invention is to provide an inexpensive closure means for a pressure vessel or heat exchanger for low pressure, high pressure and vacuum, operation which serves to reduce manufacturing costs.

Although my invention is applicable to any type of pressure container, such as pressure vessels, heat exchangers; pipe lines or as fittings for all types of pressure equipment, for the purpose of explanation, it will be described as a pressure vessel and a heat exchanger.

For more particular description of the special embodiment of my invention, which is illustrated in the drawings accompanying and forming a part of the specification.

Referring to the drawings:

Figure 1 is an elevation, partly in section of a heat exchanger showing the application of most parts of my invention of which there is shown a typical shell 10. At one end tubes 11 are attached to a removable tube sheet 12 and the other end are attached to a floating head 13. The stationary tube sheet 12 is anchored by an L-shaped split ring 14. This split ring need not be restricted to an L-shape. It may as well be of rectangular shape or any other shape. This split ring 14 is supported by a solid ring 15. The gasket ring 16 is semicircular on its outside surface and is fitted into the bar 17 and straddles the joint between shell 10 and tube sheet 12. The two contact surfaces of gasket 16 are semicircular, thus producing self-alignment when clamped against shell 10 and tube sheet 12 by tightening the nuts 18 onto studs 19.

Figure 3:
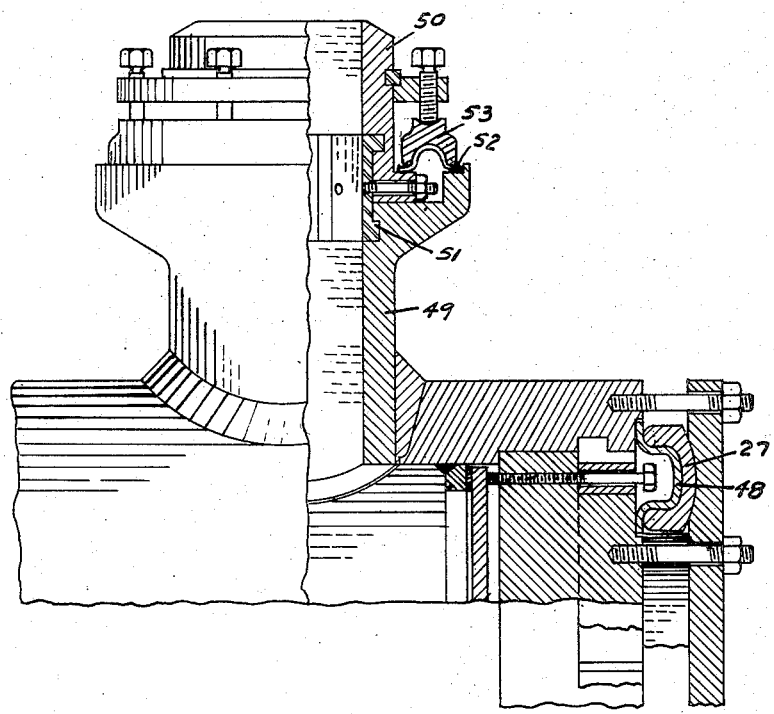

Shell nozzles 20 and channel nozzles 21 are machined for companion flanges as shown in Figure 3.

The hydrostatic end force exerted on the end cover 22 is supported by the L-shaped split ring 23. The split ring is held in place by the solid ring 24 which is provided with clearance holes for bolts 25, said bolts being used for tightening of partition cover 26 for multipass exchangers.

The end cover 22 is sealed to shell 10 by annular gasket member 27. Member 27 is provided with a semicircular outer surface adapted to mate with the follower ring 28. Follower ring 28 is supported by a plurality of stud bolts spaced along two concentric circles (see Fig. 2), those on the inner circle being given the designation 29 and those on the outer circle being given the designation 30. The gasket member is clamped against the mating sealing surfaces by tightening of nuts 31 and 32.

The end force exerted on floating head cover 33 is supported by the L-shaped split ring 34. Cover 33 is sealed to floating head 13 by an annular gasket member 27, following ring 28 is supported by studs bolts 29 and 30 and secured by nuts 31 and 32 as described in connection with the sealing of end cover 22.

Figure 2:
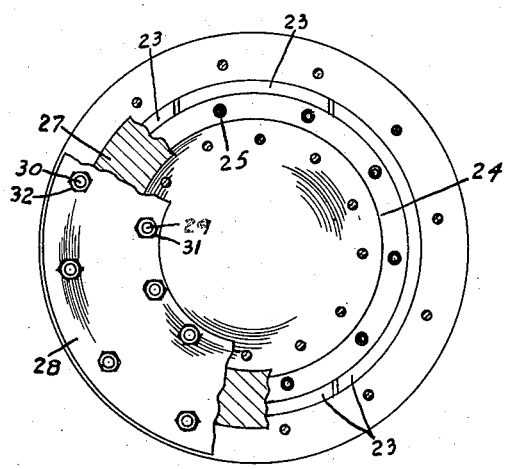

Figure 2 is a vertical end view of the channel head of a pressure vessel or heat exchanger with parts broken away, to show the attachments of the various parts.

Figure 3 is a vertical section of the channel end. In addition to gasket ring 27, a soft gasket 48 is used for low pressure applications. The attached nozzle 49 is shown with a companion flange 50, attached to the nozzle 49 by the sectional split ring 51. The nozzle 49 and companion flange 50 being sealed by gasket 52 and gasket compression ring 53. Said gasket compression ring being self adjusting by its particular shape.

Figure 4:
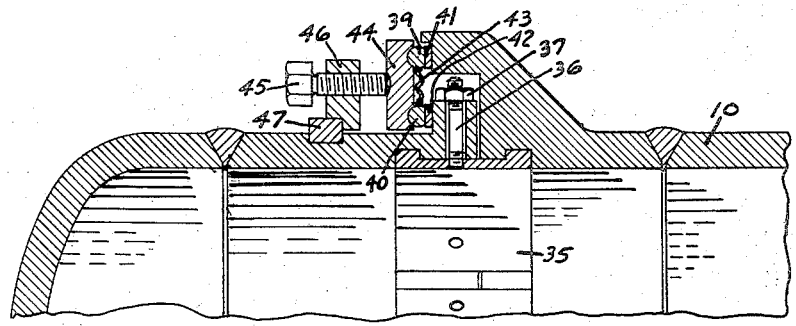

Figure 4 is an enlarged section of the floating end of shell 10 Figure 1.

Figure 5:
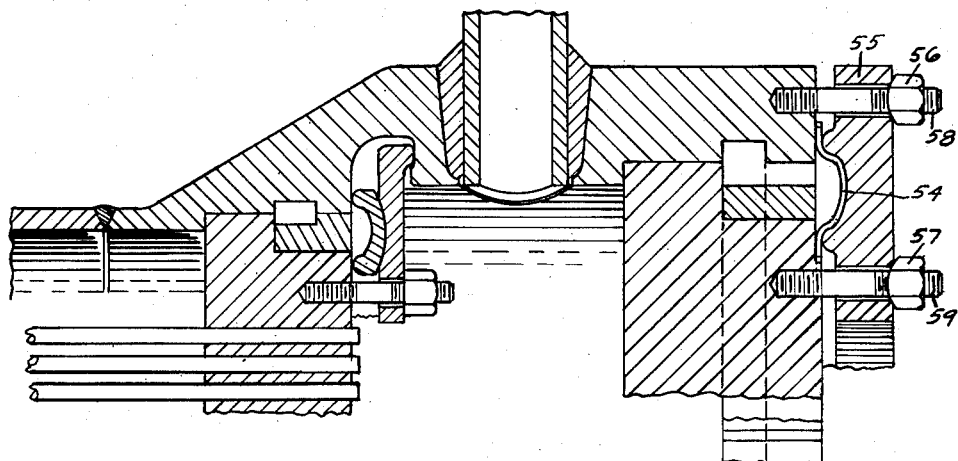

Figure 5 is an enlarged section of the channel end with a somewhat different end cover sealing arrangement, however, embodying the same principle. Gasket 54 is compressed by the force applied on the gasket compression ring 55 by tightening the nuts 56 and 57 onto the studs 58 and 59. The device is made self-adjusting by virtue of the semicircular, inside surface of the nuts 56 and 57 and by similar semicircular shape of the nut contact surface on gasket compression ring 55.

Figure 6:
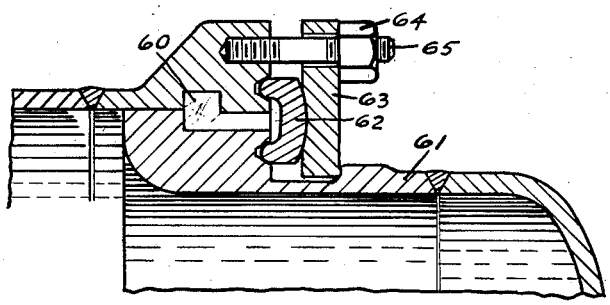

Figure 6 is a vertical section of a shell enclosure for a pressure vessel exclusively. The L-shaped split ring 60 supporting the end force, is inserted after moving the shell end 61 inside the vessel which is then repositioned so as to retain the split ring 60. The gasket 62 is made self adjusting by the semicircular outside shape of said gasket. The gasket supporting bars 63 are self adjusting when compressing the gasket 62 by tightening the nuts 24 on studs 65.

Figure 7:
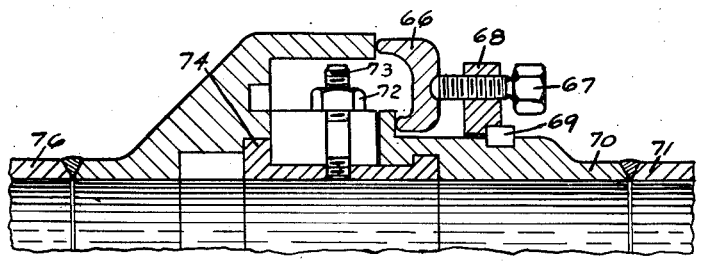

Figure 7 is a vertical section involving the same principle of sealing a pressure vessel as previously mentioned, applied to a multiple shell pressure vessel, it being desirable to be able to remove one shell section sideways. The procedure is as follows: Bolts 67 which are threaded into solid ring 68 are loosened. This permits moving of ring 68 forward and allows removal of the split ring 69 fitted into flange 70 of shell section 71. Nuts 72 are removed. Studs 73 together with split ring 74 are then moved in line with lower slot of flange 75. The split ring 74 is moved by forcing the studs 73 to the left in upper slot of flange 75 and this operation is repeated at the other end of shell section 71, thus permitting the shell section to be removed from the side.

From the above description it will be apparent that there are thus produced devices of the character described, possessing the particular features of advantage before enumerated as desirable but which obviously is susceptible of modification in its form, proportion, detail construction and arrangement of parts, without departing from the principle involved or sacrificing any of its many advantages.

I claim:

1. In combination with a heat exchanger nozzle of the type described comprising a nozzle, a nozzle extension in the form of a companion flange, said nozzle and said companion flange held together by a U-shaped split ring the improvement comprising, an annular sealing surface surrounding said companion flange, an annular sealing surface provided on said nozzle and in approximately the same plane as said companion flange sealing surface, a flexible annular sealing ring having a pair of concentric semi-circular sealing surfaces arranged to be positioned adjacent to said aforementioned sealing surfaces, clamping means in contact with said sealing ring, a set of bolts attached to said companion flange and arranged to exert pressure against said flexible annular sealing ring by means of said clamping means when said bolts are tightened.

2. Means for sealing together a pair of members comprising in combination, an annular sealing surface on each of said pair of members, said sealing surfaces being substantially in the same plane and mutually concentric, an annular member provided with a spaced pair of concentric rounded sealing surfaces with each of said rounded surfaces in contact with a corresponding one of the sealing surfaces of said pair of members, clamping means arranged to press said rounded sealing portions against said annular sealing surfaces, said rounded sealing surfaces being free to move under application of pressure so as to permit self-aligning of said rounded sealing surface with said annular sealing surface.

3. The means of claim 2 wherein a deformable gasket is interposed between said rounded sealing surface and said member annular sealing surface.

4. The means of claim 2 wherein said member annular sealing surfaces are substantially flat.

5. The means of claim 2 wherein said members are provided with tapered grooves adapted to meet with said rounded sealing surfaces.

6. A pressure vessel of the type described including a shell and a cover held together by a ring wherein said shell is provided with a flat annular sealing surface and said cover is provided with a flat annular surface in substantially the same plane and concentric with said cover annular sealing surface, a follower ring having two rounded annular sealing edges joined by a web, wherein each of said rounded sealing edges is in juxtaposition with one of said flat annular sealing surfaces, and means for tightening said follower ring to apply pressure between said sealing edges and sealing surfaces.

7. The apparatus of claim 6, wherein said web is in the form of an annular member having a rounded crown portion adapted to mate with a round portion of said ring, and a plurality of bolts cooperating with said ring to comprise said means for tightening said follower ring.

8. In a heat exchanger of the type described, comprising a hollow shell, a shell cover secured to said shell, a plurality of nozzles secured to said shell and communicating with the interior of said shell, said nozzles serving as means of introducing and removing a first fluid passing through said shell, a plurality of tubes positioned within said shell so as to be exposed to the action of said first fluid, a floating head member attached to one end of said tubes, a floating head cover secured to said floating head member so as to define a chamber common to said tubes, means for introducing a second fluid into the other of the ends of a selected number of said tubes and means for removing said second fluid from the other of the ends of the balance of said tubes, and means for securing said floating head cover to said floating head member, the improvement comprising: a first pair of concentric annular sealing surfaces, one of said sealing surfaces being located on said floating head member and the other of said first pair of annular sealing surfaces being located on said floating head cover, an annular member having concentric rounded end leg portions deployed adjacent to said first pair of concentric sealing surfaces so that one of said leg rounded end portions is opposite each of said sealing surfaces, clamping means for tightening said annular ring against said floating head member and said floating head cover, a second pair of concentric annular flat sealing surfaces, one of said second pair of concentric sealing surfaces being located on said shell and the other of said second pair of concentric sealing surfaces being located on said shell cover, a follower ring having two rounded annular sealing edges joined by a solid flexible web, one of said follower ring sealing edges being positioned over each of said second pair of concentric sealing surfaces, and means to secure said follower ring sealing edges into close relationship with said second pair of sealing surfaces.

9. In a heat exchanger of the type described comprising a shell, a shell cover secured to said shell, a plurality of nozzles secured to said shell, said nozzles serving as means of introducing and removing fluid passing through said shell, a plurality of tubes within said shell, a floating head member attached to one end of said tubes, a floating head cover secured to said floating head member so as to define a chamber common to said tubes, and means including a pair of channel nozzles, extending through said shell for introducing liquid into a number of said tubes and removing liquid from the balance of said tubes, the improvement comprising: a pair of concentric annular sealing surfaces, one of said pair of sealing surfaces being located on said floating head member, and the other of said pair of annular sealing surfaces being located on said floating head cover, an annular member having concentric rounded end leg portions deployed adjacent to said sealing surfaces so that one of said rounded end portions is opposite each of said pair of annular sealing surfaces, and clamping means for tightening said annular member against said floating head member and said floating head cover.

References Cited in the file of this patent

UNITED STATES PATENTS

| | | |
|---|---|---|
| 805,645 | Guillott | Nov. 28, 1905 |
| 2,219,659 | Price | Oct. 29, 1940 |
| 2,223,238 | Derby | Nov. 26, 1940 |
| 2,268,507 | Gertzon | Dec. 30, 1941 |
| 2,296,620 | Tinker | Sept. 22, 1942 |
| 2,301,113 | Ettington et al. | Nov. 3, 1942 |
| 2,471,658 | Shaffer et al. | May 31, 1949 |
| 2,520,755 | Brown Jr. | Aug. 29, 1950 |
| 2,768,847 | Peyrin et al. | Oct. 30, 1956 |